United States Patent
Ye et al.

(10) Patent No.: US 8,880,024 B2
(45) Date of Patent: Nov. 4, 2014

(54) METHOD, DEVICE AND COMPUTER PROGRAM PRODUCT FOR UPDATING LOCATION NUMBERS ON AN MSC

(75) Inventors: Yinghai Ye, Shanghai (CN); Geert Claassen, Nättraby (SE); Yingbao Long, Shanghai (CN); Karl-Johan Östh, Karlskrona (SE); Jenny Håkansson, Lyckeby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 316 days.

(21) Appl. No.: 13/393,190

(22) PCT Filed: Dec. 23, 2009

(86) PCT No.: PCT/SE2009/000538
§ 371 (c)(1),
(2), (4) Date: Feb. 28, 2012

(87) PCT Pub. No.: WO2011/040844
PCT Pub. Date: Apr. 7, 2011

(65) Prior Publication Data
US 2012/0157086 A1   Jun. 21, 2012

Related U.S. Application Data

(60) Provisional application No. 61/247,132, filed on Sep. 30, 2009.

(51) Int. Cl.
*H04M 11/00* (2006.01)
(Continued)

(52) U.S. Cl.
CPC .............. *H04M 15/00* (2013.01); *H04W 88/14* (2013.01); *H04M 15/8033* (2013.01);
(Continued)

(58) Field of Classification Search
USPC ...................... 455/405–408, 422.1
See application file for complete search history.

(56) References Cited

U.S. PATENT DOCUMENTS 5,787,354 A * 7/1998 Gray et al. ................. 455/456.1
6,097,937 A * 8/2000 Sawyer ......................... 455/406
(Continued)

FOREIGN PATENT DOCUMENTS

EP    1 209 937 A2    5/2002
EP    1209937 A2 *   5/2002    ............... H04Q 7/38
(Continued)

OTHER PUBLICATIONS

International Search Report, PCT Application No. PCT/SE2009/000538, Aug. 26, 2010.
(Continued)

*Primary Examiner* — Mehmood B Khan
(74) *Attorney, Agent, or Firm* — Myers Bigel Sibley & Sajovec, P.A.

(57) ABSTRACT

A method and apparatus of updating location numbers of cells associated with a mobile switching center, MSC (110), wherein each cell has a location number (124), identifying the cell and representing a discount applicable to the cell, wherein a first set of one or more digits (D1) of the location number represents a first discount applicable to service usage in the cell during a first time interval, and a second set of one or more digits (D2) of the location number represents a second discount applicable to service usage in the cell during a second time interval. The method comprising: for each cell, receiving in the MSC (110) within a first time interval, a location number for the cell with an updated second set of the one or more digits representing the second discount; in response to any service request during the first time interval, applying charging of the requested service with the first discount; for each cell, receiving in the MSC (110) within a second time interval following the first time interval, a location number for the cell with an updated first set of the one or more digits representing the first discount and; and applying charging of the requested service with the second discount.

14 Claims, 5 Drawing Sheets

(51) Int. Cl.
*H04M 15/00* (2006.01)
*H04W 88/14* (2009.01)
*H04W 8/26* (2009.01)

(52) U.S. Cl.
CPC ............ *H04W 8/26* (2013.01); *H04M 15/8083* (2013.01); *H04M 15/80* (2013.01)
USPC .......... 455/408; 455/405; 455/406; 455/407; 455/422.1

(56) References Cited

U.S. PATENT DOCUMENTS

| | | | |
|---|---|---|---|
| 6,275,695 B1* | 8/2001 | Obhan | 455/423 |
| 6,366,780 B1* | 4/2002 | Obhan | 455/453 |
| 8,396,811 B1* | 3/2013 | Hahn-Carlson | 705/75 |
| 2002/0128012 A1* | 9/2002 | Kim et al. | 455/433 |
| 2004/0198380 A1* | 10/2004 | Unmehopa | 455/456.1 |
| 2005/0216354 A1* | 9/2005 | Bam et al. | 705/26 |
| 2006/0030291 A1* | 2/2006 | Dawson et al. | 455/405 |
| 2006/0040641 A1* | 2/2006 | Dawson et al. | 455/405 |
| 2008/0039064 A1* | 2/2008 | Cai et al. | 455/422.1 |
| 2009/0061821 A1* | 3/2009 | Chen et al. | 455/411 |
| 2009/0215429 A1* | 8/2009 | Caldwell et al. | 455/406 |
| 2009/0239576 A1* | 9/2009 | Liao et al. | 455/552.1 |
| 2010/0216439 A1* | 8/2010 | Marcelli et al. | 455/414.1 |
| 2011/0275365 A1* | 11/2011 | Fischer et al. | 455/423 |
| 2013/0288640 A1* | 10/2013 | Bonner | 455/406 |

FOREIGN PATENT DOCUMENTS

| | | | |
|---|---|---|---|
| EP | 1 761 099 A1 | 3/2007 | |
| EP | 1761099 A1 * | 3/2007 | ............... H04Q 7/38 |
| WO | WO 2007/140007 A2 | 12/2007 | |
| WO | WO 2007140007 A2 * | 12/2007 | |

OTHER PUBLICATIONS

3 GPP TS 23.003 V3.15.0 (Sep. 2006) 3$^{rd}$ Generation Partnership Project; Technical Specification Group Core Network; Numbering, addressing and identification (Release 1999), Sections 4, 11, 12.
Mobile Tech News Monday, Aug. 23, 2010 Ericsson's Dynamic Discount solution dramatically reduces mobile call rates http://www.mobiletechnews.com/info/2009/06/24/115353.html.

* cited by examiner

METHOD, DEVICE AND COMPUTER PROGRAM PRODUCT FOR UPDATING LOCATION NUMBERS ON AN MSC

CROSS REFERENCE TO RELATED APPLICATIONS

This application is a 35 U.S.C. §371 national stage application of PCT International Application No. PCT/SE2009/000538, filed on 23 Dec. 2009, and claims further priority from U.S. Provisional Application No. 61/247,132, filed 30 Sep. 2009, the disclosures and content of which are incorporated by reference herein in their entirety. The above-referenced PCT International Application was published in the English language as International Publication No. WO 2011/040844 A8 on 7 Apr. 2011.

TECHNICAL FIELD

The present invention relates generally to a method and a device of updating location numbers of cells associated with a mobile switching centre, MSC, and more particularly to a method and a device of updating location numbers of cells, wherein each cell has a location number stored in a database of the MSC, said location number comprising digits identifying the cell and a discount applicable to the cell.

BACKGROUND

Efficient utilization of the network capacity by means of traffic load balancing is a key issue in different kinds of electronic communication networks, such as telecommunication or data communication networks. According to some known solutions, traffic balancing in telecommunication networks over the time has been based on the change of service usage by the subscribers to decrease traffic on the network at peak times and increase network traffic during quiet times.

Dynamic Discount Solution (DDS) is a revenue management or charging solution that aims to change subscriber call patterns to decrease traffic on the network at peak times and increase network traffic during quiet times by offering dynamic call charges according to where and when the subscriber initiates a call. Thereby, DDS can help operators to have more efficient utilization of the network capacity.

DDS is able to offer a mobile network customer a discount based on the amount of capacity available at their current location in the network. The software looks at for example the GSM radio network from where the customer is calling and assesses the amount of capacity available in the network. Depending on the amount of capacity available, the customer is awarded a discount, which is also submitted for display on the customer's mobile phone. This discount is available for one or more services, such as the duration of a phone call or a number of SMS messages or an amount of internet traffic. The discount available to customers changes periodically depending on the amount of capacity available at their specific location in the network. Generally, the more capacity there is at their location, the higher the discount that is offered.

Hence, consumers are given the opportunity to see the discount currently available at their location on their mobile phone's screen in real-time. People using this solution can receive considerable discounts by calling during low-traffic periods, while the network traffic is balanced at the same time. The Dynamic Discount Solution may be available to any subscriber charged in real-time, whether pre-paid or part of a converged charging system, and can also be used by a billing system to apply discount in post paid cases.

One known DDS approach is based on Location Number update, whereby a Cell can be identified on the MSC by using the Location Number.

This existing DDS solution is also known as real-time provisioning DDS since all the Cells must be provisioned in a short time, otherwise the effectiveness of DDS will be impacted because of delay between the time when actual discount is charged and the time when discount is scheduled for.

MSCs are telecom grade systems, optimized to carry traffic, and changing Exchange Data is not usually a prioritized task on the MSC. Handling traffic is prioritized over system maintenance and configuration and thus results in unusual long execution times, the effect of which is worst during high traffic load.

Design Rules exist on the MSC, which do not allow multiple accesses to the same set of exchange data in order to avoid any risk of MSC exchange data interference and corruption. The Location Number assigned to a cell is part of the MSC's critical exchange data, including cell configuration data, which impacts call routing, handling and charging. Hence, the design rules applied do not allow for multiple Location Number updates in parallel.

The slow response times mean that if one MSC holds a large number of cells, in some cases one MSC may hold 2000 cells, it will take tens of minutes to update the Location Number for all cells, which impacts the DDS solution and the results that can be achieved negatively.

The Location Number Update based DDS solution requires the Location Number being updated on the MSC in a near real-time way to secure the discount taking effect in a very short time. Usually the acceptable provisioning lead time is around 3 to 5 minutes, without negatively impacting DDS.

Besides the performance problem with MSC in Location Number update, the network connection speed and provisioning performance of the Provisioning System can also affect the effectiveness of DDS in large operator networks.

SUMMARY

It is an object to overcome at least some of the above-mentioned disadvantages and to improve Location Number update on an MSC (mobile switching centre).

By using the Location Number holding discounts for consecutive time intervals, it is provided an asynchronous method of updating the Location Number of the MSC in a Dynamic Discount Solution (DDS).

A first aspect of the present invention is a method of updating location numbers of cells associated with a mobile switching centre, MSC, wherein each cell has a location number stored in a database of the MSC, said location number comprising a number of digits identifying the cell and representing a discount applicable to the cell, wherein a first set of one or more digits of the location number represents a first discount applicable to service usage in the cell and a second set of one or more digits of the location number represents a second discount applicable to service usage in the cell. The method comprises:

for each cell, receiving in the MSC within a first time interval, a location number for the cell with an updated second set of the one or more digits representing the second discount and updating the location number of the cell stored in the MSC;

in response to any service request during the first time interval, fetching the location number from the database of the MSC for the cell, from which the service is originating, and sending the location number to a charging system for charging of the requested service with the first discount;

for each cell, receiving in the MSC within a second time interval following the first time interval, a location number for the cell with an updated first set of the one or more digits representing the first discount and updating the location number of the cell stored in the MSC; and in response to any service request during the second time interval, fetching the location number from the database of the MSC for the cell, from which the service is originating, and sending the location number to a charging system for charging of the requested service with the second discount.

In one or more embodiments the first set of the one or more digits of the location number may comprise one or more digits identifying a service associated with the first discount and the second set of the one or more digits of the location number may comprises one or more digits identifying a service associated with the second discount.

The location number may, but is not limited to, a number of digits configured in one or more groups of digits.

In one or more embodiments, the location number may comprise not more than 15 digits.

The first and second time intervals may be, but is not limited to any consecutive time intervals of a determined length repeated any number of times.

In one or more embodiments, each set of the one or more digits are any available number of digits of the location number.

A second aspect of the invention is a computer program comprising program instructions for causing a computer to perform the method according to the first aspect of the invention, when said program is run on a computer.

The computer program may be stored on a carrier and comprise computer executable instructions for causing a computer to perform the method according to the first aspect of the invention, when said program is run on a computer.

The above-mentioned carrier may be, but is not limited to, a record medium, computer memory, read-only memory or an electrical carrier signal.

A third aspect of the invention is a computer program product comprising a computer readable medium, having thereon: computer program code means, when said program is loaded, to make the computer execute the process according to the first aspect.

A fourth aspect of the invention is a mobile switching centre, MSC, for updating location numbers of cells associated with the MSC. The MSC comprises:

a data store configured to store a location number for each of the cells, wherein said location number comprising a number of digits identifying the cell and representing a discount applicable to the cell, wherein a first set of one or more digits of the location number represents a first discount applicable to service usage in the cell and a second set of one or more digits of the location number represents a second discount applicable to service usage in the cell;

a location number receiving component configured to receive during a first time interval, a location number for each of the cells with an updated second set of the one or more digits representing the second discount; and receive during a second time interval following the first time interval, a location number for each of the cells with an updated first set of the one or more digits representing the first discount;

a location number updating component configured to update, during the first time interval, the location number of each of the cells stored in the MSC; and update, during the second time interval, the location number of each of the cells stored in the MSC;

a service request receiving component configured to receive a service request; and a location number fetching and sending component configured to fetch from the data store, the location number for the cell, from which the service is originating, and send the location number to a charging system for charging of the requested service with the first discount, in response to any service request during the first time interval; and fetch from the data store, the location number for the cell, from which the service is originating, and sending the location number to a charging system for charging of the requested service with the second discount, in response to any service request during the second time interval.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In order to explain the invention in more detail and the advantages and features of the invention, a embodiments will be described in detail below, reference being made to the accompanying drawings, in which.

DETAILED DESCRIPTION

Figure 1:
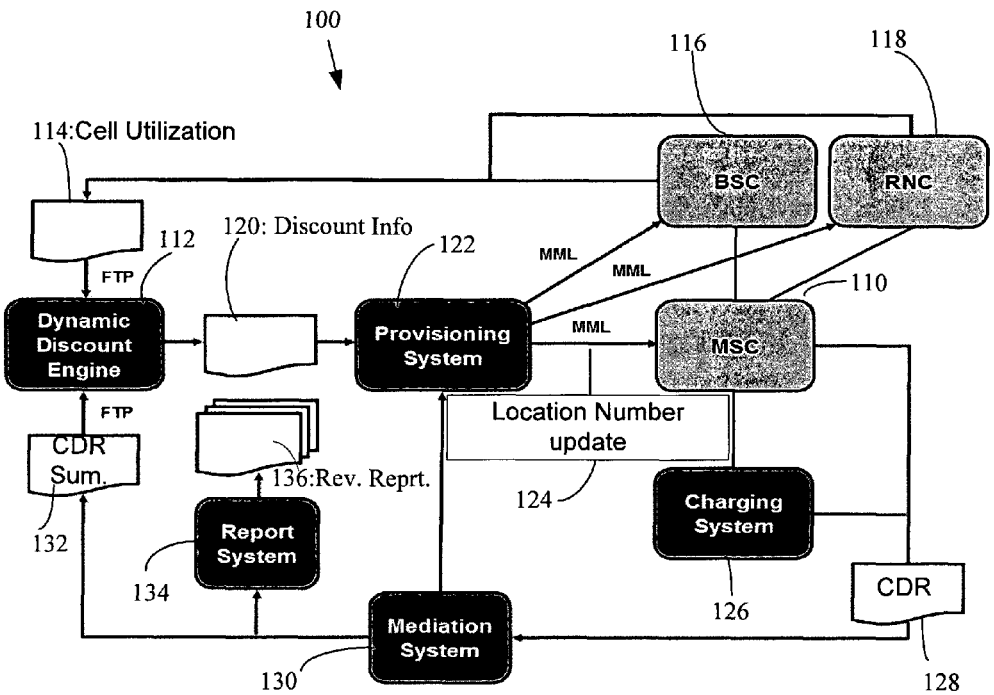
FIG. 1 shows a block diagram illustrating an embodiment of a high level network architecture comprising network elements for Location Number Update.

Embodiments of the invention will be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 is a block diagram illustrating an embodiment of a high level network architecture 100 comprising network elements forming a network environment in which the inventive method and device are operating for updating Location Numbers. The elements may be separate standalone network elements or arranged in groups of two or more elements. The Location Number is a number related to a certain geographical area or a cell in a cellular communications system or network, as specified by a network operator. The Location Number is used to implement features like regional/local subscription and geographical differentiated charging.

A GSM or UMTS network is an example of a cellular network, which is a radio network of a number of individual cells. Each cell or location area is identified in a network element called a mobile switching center (MSC) 110. An embodiment of the MSC 110 is the primary service delivery node for GSM, responsible for handling services, for example but not limited to voice calls, SMS, conference calls, FAX and circuit switched data. The MSC 110 may be adapted to set up and releases the end-to-end connection, handles mobility and hand-over requirements during the call and may take care of charging and real time pre-paid account monitoring.

A Dynamic Discount Engine 112 is adapted to receive cell based utilization statistic information 114 from the radio access network, which may be but is not limited to a 2G and/or a 3G radio access network. In 2G networks the source is a base station controller (BSC) 116 while in 3G networks the source is a radio network controller (RNC) 118.

The base station controller BSC 116 handles allocation of radio channels, receives measurements from the mobile phones, controls handovers between base transceiver stations (BTS). A key function of the BSC 116 is to act as a concentrator where many different low capacity connections to BTSs become reduced to a smaller number of connections towards the MSC 110. Typically a BSC has tens or even hundreds of BTSs under its control. Networks are often structured to have many BSCs distributed into regions near their BTSs which are then connected to large centralised MSC sites.

The RNC 118 is a governing element in the UMTS radio access network (UTRAN) and is responsible for control the Node Bs that are connected to it. Node B is a term used in UMTS to denote the BTS (base transceiver station). In contrast with GSM base stations, Node B uses WCDMA/TD-SCDMA as air transport technology. As in all cellular communications systems, such as UMTS and GSM, Node B contains radio frequency transmitter(s) and the receiver(s) used to communicate directly with mobile devices. The RNC carries out radio resource management, some of the mobility management functions and is the point where encryption is done before user data is sent to and from the mobile device. The main functions of the RNC are management of radio channels and the terrestrial channels.

The Dynamic Discount Engine 112 is also adapted to receive a summary of usage data 114 for each cell and for each hour, summarizing what traffic occurred in a cell every hour and the revenue generated. Based on this data and the historical data the system determines the optimal discount to be applied for each cell for each hour of every day of the week.

Moreover, the Dynamic Discount Engine 112 is adapted to send the determined discount as discount information 120 to a Provisioning System 122, which is responsible for ensuring that discounts are applied correctly in the network. In order to apply the discount correctly in the network, the Provisioning System 122 is adapted to update the Location Number 124 on the MSC 110.

Moreover, the Provisioning System 122 is adapted to submit information for updated Cell Broadcast messages on either the BSC (2G Cell) or the RNC (3G Cell), so that the users connected to a cell know what discount they can get at their current location.

Note that the provisioning of Cell broadcast messages can also be done in advance provided the BSC/RNC has scheduling capability for Cell broadcast messages. This can then be done either in parallel with the MSC update or even earlier then that, depending on what is deemed appropriate.

As mentioned above, the Location Number 124 is used as an identification of the cell and is a configurable parameter on the MSC 110. The value of the Location Number is used to identify the discount to be applied for that location (i.e. cell). The MSC 110 is adapted to update the Location Number 124 for each cell and provide the Location Number to a Charging System 126, which is adapted to read and interpret the relevant data of the Location Number and determine the correct discount to apply for the current service. During Call setup the Charging System receives information from the network, including the Location Number, allowing Charging System to charge for the call. Based on the Location Number and the discount digits included it knows what discount should be applied when rating the call. The Charging System is adapted to understand and interpret the algorithm used on the Location Number for extracting the right discount from the Location Number. Typically, this is configurable in the Charging System.

Further, the Charging System 126 is adapted to generate Call Detail Records (CDR) 128 for the service/call. A Call Detail Record (CDR) is a computer record produced by a telephone exchange containing details of a call that passed through it. The Charging System 126 is adapted to send the CDRs to a Mediation System 130 adapted to process the CDR information into a CDR summary information 132 for each cell and for each hour. The Mediation System 130 is adapted to send the CDR summary information 132 to the Dynamic Discount Engine 112.

According to some embodiments a Report System 134 is also provided, which is adapted to generate Revenue Reports 136.

The Location Number may be an E.164 compliant number and may comprise a suitable limited number of digits, preferably but not limited to 10-15 digits. The first digits may be the MCC (Mobile Country Code) followed by the MNC (Mobile Network Code) and the actual subscriber number or as in this case an operator-defined location identification.

Since the Location Number is used for different purposes, for example Location Based Services, may have a maximum of approximately 15 digits, and due to the fact that the Location Number must be E.164 compliant, the amount of free digits to use for discount information is in most cases limited to 2, 3, or 4 available digits. However, even 5, 6, 7 or more digits may be used if they are available.

In some embodiments, the location number may have another format including one or more groups of digits separated by a sign.

Figure 2:
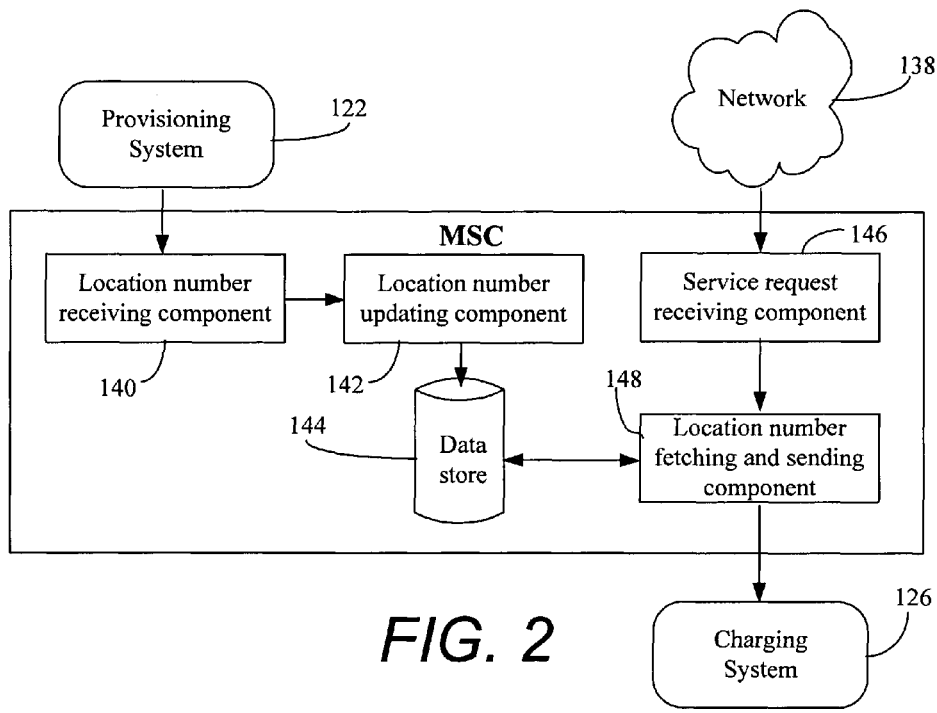
FIG. 2 shows a block diagram illustrating an embodiment of an MSC and connected network elements.
Figure 3:
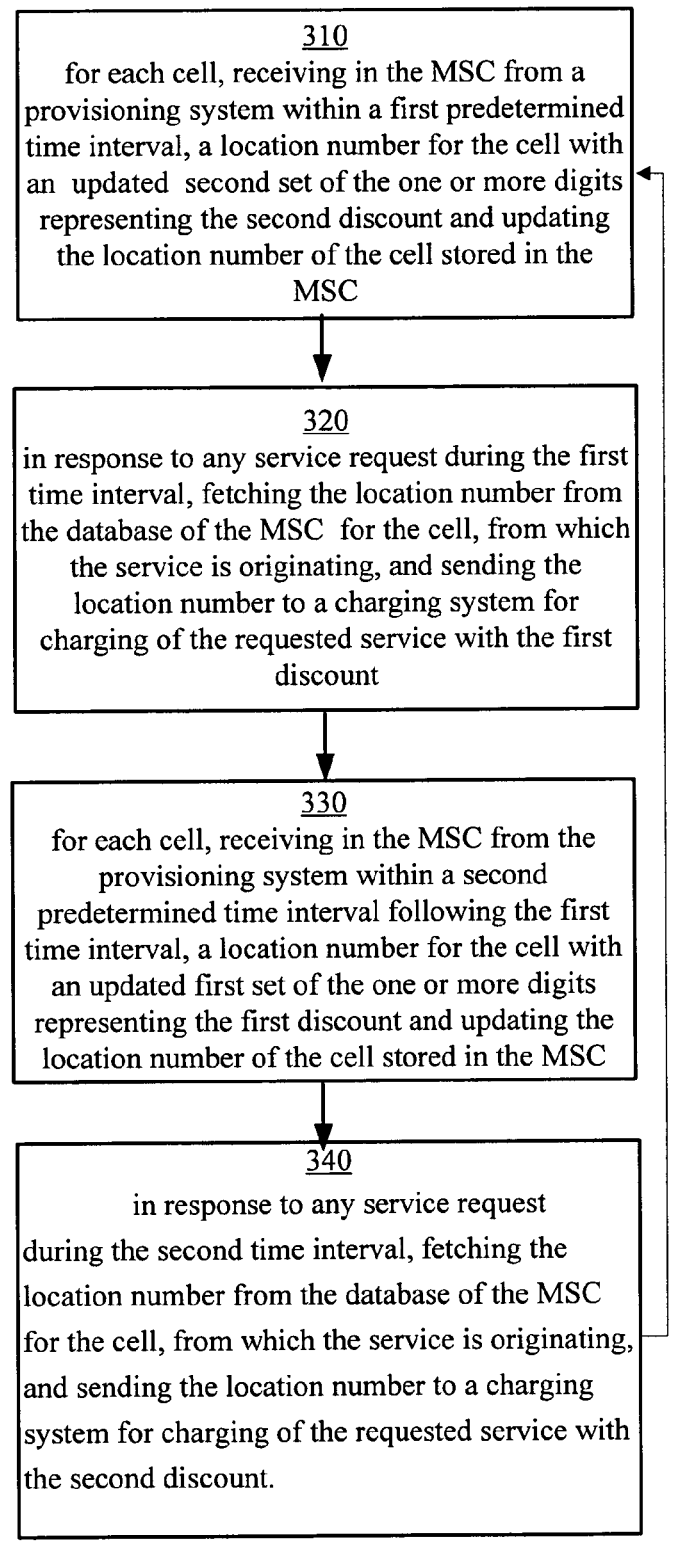
FIG. 3 shows a flowchart of a method of updating location numbers according to one embodiment of the invention.

The configuration of the MSC 110 will now be described with reference to FIG. 2. The MSC 110 is for the purpose of illustration and not intended as limiting features for the MSC, disclosed together with connected network elements, namely the Provisioning System 112 and a network 138, that may include, but is not limited to, BSCs 116 and RNCs 118. As mentioned above, the MSC 110 is the primary service delivery node for GSM, responsible for handling services.

In this embodiment, the MSC 110 may comprise, but is not limited to, a Location number receiver 140 adapted to receive Location Numbers 124 from the Provisioning System 122, and a Location number updater 142 adapted to update a Data store 144 with the received Location Number for the cell in the MSC, i.e the received Location Number is stored as a record in for example a database in the Data store 144. The MSC has a Service request receiver 146 adapted to receive a request for setting up a service connection. The MSC 122 is also involved in the charging of delivered services, which will be described in further detail. According to some embodiments the location number may comprise digits representing discount information to be used by the Charging system 126. A location number fetch and send element 148 of the MSC is adapted to fetch the Location Number for the requested service of the cell from the Data store 144 and send the Location Number to the charging system 126 for calculation of the discount based on the information represented by the discount digits of the Location Number.

The functionality of the MSC 122 will now be described in connection with embodiments of the method of updating the Location Number of cells associated with the MSC. Each cell has a location number 124 stored in the database 144 of the MSC 122, wherein the location number comprises a number of digits identifying the cell and representing a discount applicable to the cell. A first set of one or more digits of the location number represents a first discount applicable to service usage in the cell and a second set of one or more digits of the location number represents a second discount applicable to service usage in the cell.

The Location Number of a cell currently stored in a record of the database 144, may comprise the following 10 digits: 278300000<u>1</u>. According to this example embodiment, the least significant digit D1="<u>1</u>" indicates that a 10% discount should be applied on calls during a first time interval.

For each cell, the MSC receives from the Provisioning System 122 within a first predetermined time interval, a location number for the cell with an updated second set of the one or more digits representing the second discount, and update the location number of the cell stored in the MSC based on the received location number in step 310. In this example, the Location Number with the updated second set of the one or more digits is 27830000<u>2</u>1. According to this example embodiment, the second least significant digit D2="<u>2</u>" indicates that a 20% discount should be applied on calls during a second time interval.

In response to any service request, a call in this example embodiment, during the first time interval, the location number for the current cell is fetched from the database 144 of the MSC 122 for the current cell, from which the service is originating, and sent to the location number to a charging system for charging of the requested service with the first discount, i.e 10%, in step 320.

The stored location number may be either: 278300000<u>1</u> or if the MSC 122 already has been able to updated the database 144 with the updated Location Number it will be: 27830000<u>2</u>1, that is fetched. However, independent of if it is the first stored location number or the updated location number that is fetched in response to the service request during the first time interval, the least significant digit D1 is "1" in both cases. Since the MSC is adapted to update the second set of the one or more digits representing the second discount, i.e the second least significant digit D2 in this example, based on the updated location number from the Provisioning System, during the first time interval, it is also guaranteed that the charging will apply the correct discount, 10% in this example, during the first time interval.

For each cell, the MSC receives from the Provisioning System 122 within a second predetermined time interval following the first time interval, a location number for the cell with an updated first set of the one or more digits representing the first discount and update the location number of the cell stored in the MSC in step 330.

In this example, the Location Number with the updated first set of the one or more digits is 27830000<u>2</u><u>3</u>. According to this example embodiment, the least significant digit D1="<u>3</u>" indicates that a 30% discount should be applied on calls during a second predetermined time interval following the previous, i.e the first time interval.

In response to any service request, a call in this example embodiment, during the second time interval, the location number for the current cell is fetched from the database 144 of the MSC 122 for the current cell, from which the service is originating, and sent to the location number to a charging system for charging of the requested service with the second discount, i.e 20%, in step 340.

The stored location number may be either: 27830000<u>2</u>1 or if the MSC 122 already has been able to updated the database 144 with the updated Location Number it will be: 278300002<u>3</u>, that is fetched. However, independent of if it is the first stored location number or the updated location number that is fetched in response to the service request during the first time interval, the second least significant digit D2 is "2" in both cases. Since the MSC is adapted to update only the first set of the one or more digits representing the first discount, i.e the least significant digit D1 in this example, based on the updated location number from the Provisioning System, during the second time interval, it is also guaranteed that the charging will apply the correct discount, 20% in this example, during the second time interval.

The first and second time intervals of the method described above may represent any two consecutive time intervals of any suitable duration according to the specific implementation of the method, for example two consecutive hours. Moreover, the first time interval is followed by the second time interval, which in turn is followed by another the first time interval and so on. Hence, the method steps 310-340 are repeated, for example every two hours.

Figure 4:
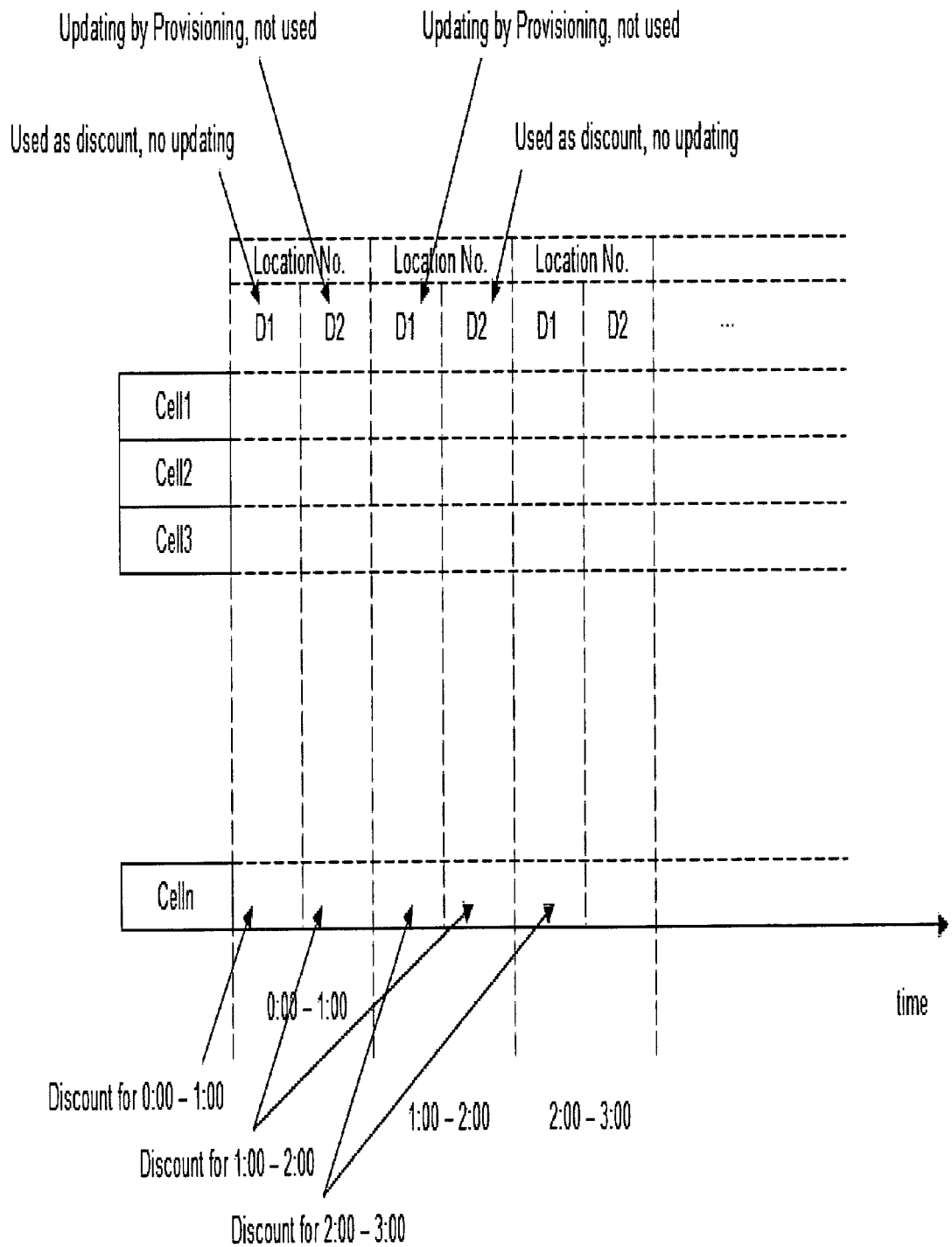
FIG. 4 illustrates a Location Number plan for updating Location Numbers of an MSC according to a first embodiment of the method of the invention.

FIG. 4 illustrates a Location Number plan for updating Location Numbers of an MSC according to the method described in conjunction described above. Two digits D1 and D2 of the Location Number are available for DDS. Each of the digits D1 and D2 may have a value between 0-9, each corresponding to a discount. So that up to 10 discounts can be supported in this case. The different values may correspond to different predetermined discounts. For example, 0 may represent 0% discount, 1 may correspond to 5% discount, 2 may correspond to 15% discount etc.

The left hand column in FIG. 4 represents different cells: Cell1, Cell2, . . . Celln, where n is the number of cells served by the MSC. Number of cells may be a few hundred, a thousand or up two thousand and even more. The next column labelled Location No. to the right is divided in two sub columns with a first digit D1 and a second digit D2, the value of which representing a first and a second discount to be used for the current cell in the row. The discount corresponding to D1 is kept unchanged in this hour and is by the Charging System during the first time interval, i.e during a first hour between 0:00-1.00, while the discount corresponding to D2 is updated during the first time interval in order to be applied during the next time interval between 1:00-2.00.

The next column labelled Location No. illustrates the second time interval between 1:00-2:00. The two sub columns also with the first digit D1 and the second digit D2, have values representing a first and a second discount to be used for the current cell in the row. The discount corresponding to D2, was updated during the first time interval between 0:00-1:00 and is kept unchanged in this second hour between 1:00-2:00 to be used by the Charging System during this second time interval, i.e during the second hour between 1:00-2:00. The discount corresponding to D1 is updated during the second time interval in order to be applied during the next time interval between 2:00-3:00.

The third column labelled Location No. illustrates the third time interval between 2:00-3:00. The two sub columns also with the first digit D1 and the second digit D2 have values representing a first and a second discount to be used for the current cell. The discount corresponding to D1, was updated during the second time interval between 1:00-2:00 and is used by the Charging System during the third time interval, i.e during the third hour between 2:00-3:00, while the discount corresponding to D2 is updated during the third time interval in order to be applied during the next time interval between 3:00-4:00, not shown.

In an alternative embodiment 4 digits of the Location Number is available and may be used for DDS, which supports a maximum of 100 discounts.

Figure 5:
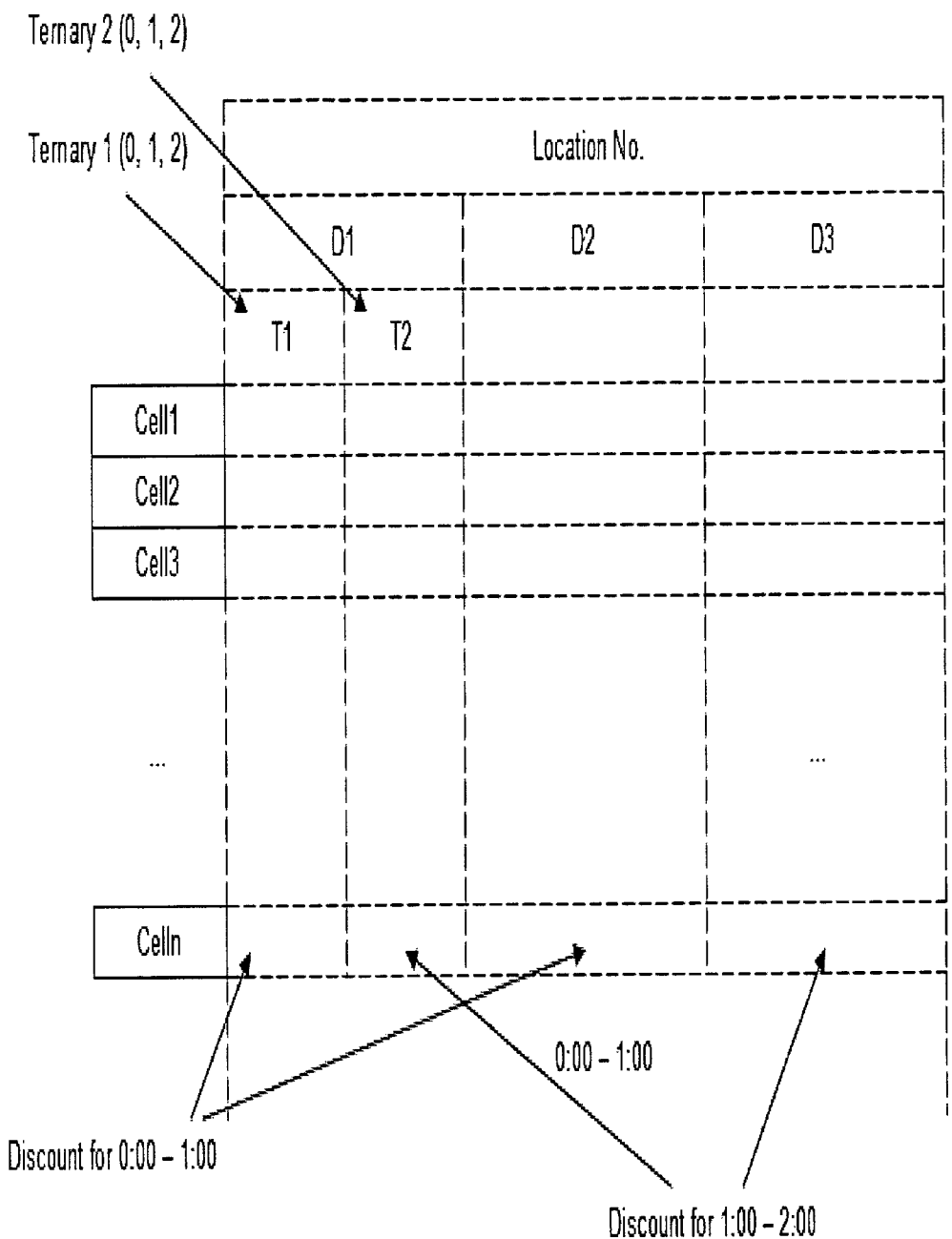
FIG. 5 illustrates a Location Number plan for updating Location Numbers of an MSC according to a second embodiment of the method of the invention.

FIG. 5 illustrates a Location Number plan for updating Location Numbers of an MSC according to another embodiment of the method of updating Location Numbers when 3 digits are available for DDS.

According to this embodiment digit D2 and digit D3 are working in the same way as digit D1 and digit D2 in the 2 digits plan described in conjunction with FIG. 4, while digit D1 is interpreted as 2 ternary values (T1 and T2). Thereby, a maximum of 30 discounts can be supported with the combination of T1D2 and T2D3. Alternatively, the ternary digits may be used as well for 2 services with 10 discounts each.

Figure 6:
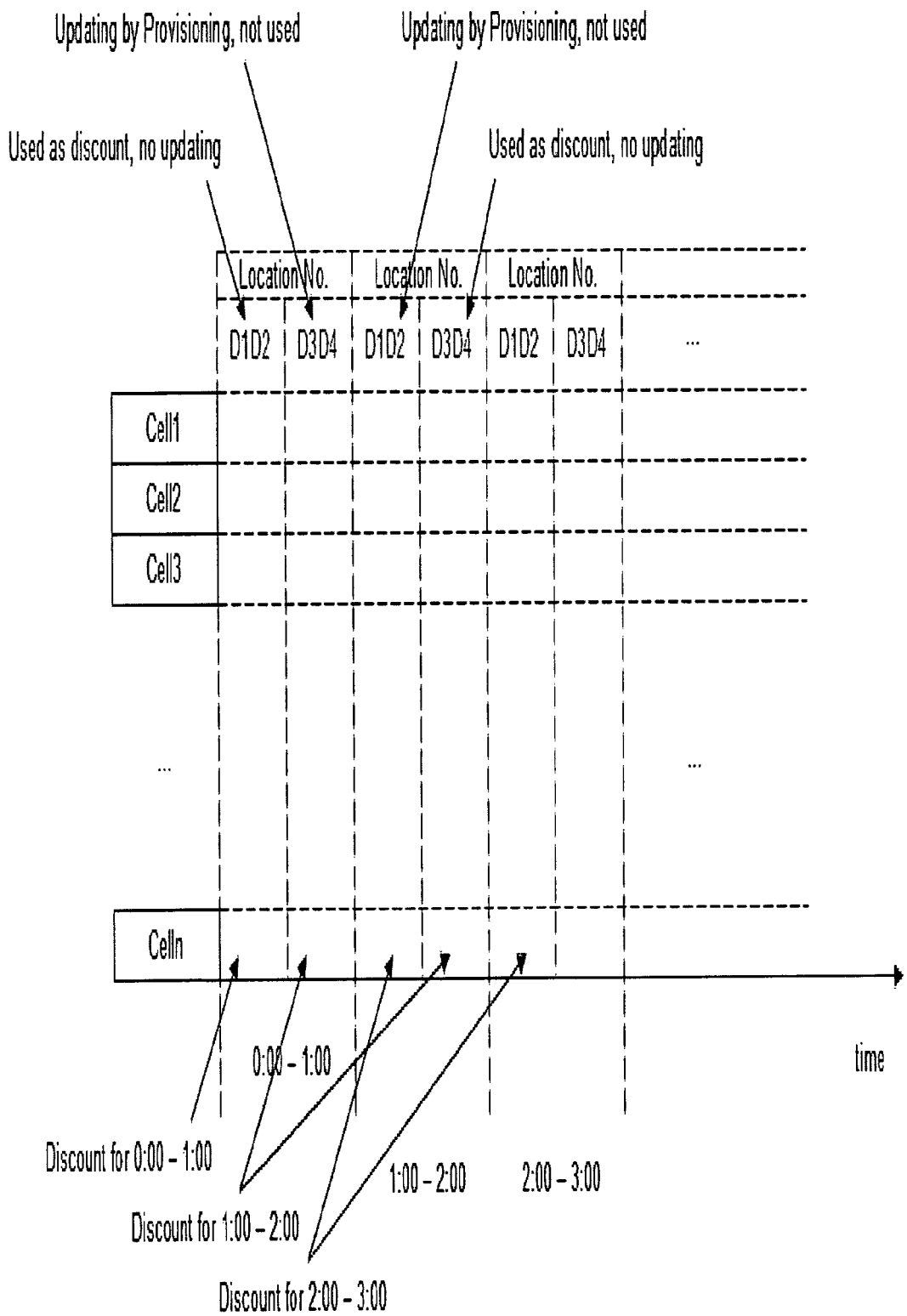
FIG. 6 illustrates a Location Number plan for updating Location Numbers of an MSC according to a third embodiment of the method the invention.

FIG. 6 illustrates a Location Number plan for updating Location Numbers of an MSC according to still another embodiment of updating Location Numbers when a number of digits are available for DDS for supporting multiple services.

If 4 digits are available then the Location Number can be used for support separate discounts for 2 services (for example Voice and SMS), as shown in FIG. 6.

Since the digit may have a value between, 0-9, each representing a discount, up to 10 discounts can be supported in this case. At least 4 available digits are needed which can be used in a similar way as in the plan disclosed in FIG. 4.

Take again the time period of 0:00-3:00 as an illustrative example, the least significant digit D1 and the third least significant digit D3 of the Location Number are used for Voice discount, while the second least significant digit D2 and the fourth least significant digit D4 of the Location Number are used for SMS discount.

D1 of the Cell Location Number is used by the Charging System as the current Voice discount during 0:00-1:00, while for SMS this is identified by D2. Although, the Location Number is being updated at D3 and D4 during the time interval 0:00-1:00 for the next hour, D1 and D2 are kept unchanged during this hour. During 1:00-2:00, D1 and D2 will be updated for the next hour, while D3 and D4 are kept unchanged in this hour to be used by the Charging System.

Alternatively, D1 and D2 could be used for the Voice discount in even and odd hours, while D3 and D4 could be used for the SMS discount in even and odd hours.

This solution essentially means that solving the issue of the near real-time update of the Location Number while at the same time supporting discounts for multiple services requires 2 extra digits for each additional service required.

In the case of using Location Number as discounts for multiple services, the invention provides multiple services support in for Location Number update based DDS, even when there are limited digits available in the Location Number.

The impact on DDS is eliminated or at least reduced by the performance bottleneck of the MSC for Location Number updating. Operators may thereby recognise who currently use the Location Number for other purposes to use the limited amount of free digits available in the Location Number for the DDS service and not suffer from any performance issues due to the long update times on the MSC.

The present invention may be embodied as a method, device, system or computer program product. Accordingly, the present invention may take the form of an entirely hardware embodiment, a software embodiment or an embodiment combining software and hardware aspects all generally referred to herein as a unit, component or device. Furthermore, the present invention may take the form of a computer program product. The computer program product may be stored on a computer-usable storage medium having computer-usable program code embodied in the medium. Although the embodiments of the invention described with reference to the drawings comprise a computer apparatus and processes performed in the computer apparatus, the invention also extends to programs on or in a carrier, adapted for putting the invention into practice when the computer program is executed. The program may be in the form of source code, object code a code suitable for use in the implementation of the method according to the invention. The carrier can be any entity or device capable of carrying the program. For example the carrier may be a record medium, computer memory, read-only memory or an electrical carrier signal. Embodiments according to the invention may be carried out when the computer program product is loaded and run in a system having computer capabilities.

Any suitable computer readable medium may be utilized including hard disks, CD-ROMs, a RAM (Random Access Memory), a ROM (Read Only Memory), a flash memory, optical storage devices, a transmission media such as those supporting the Internet or an intranet, or magnetic storage devices.

Embodiments of the present invention has been described herein with reference to flowchart and/or block diagrams. It will be understood that some or all of the illustrated blocks may be implemented by computer program instructions. These computer program instructions may be provided to a processor of a general purpose computer, special purpose computer, or other programmable data processing apparatus to produce a machine, such that the instructions when executed create means for implementing the functions/acts specified in the flowchart otherwise described.

It is to be understood that the functions/acts noted in the flowchart may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

A computer program product may comprise computer program code portions for executing the method, as described in the description and the claims, for providing control data when the computer program code portions are run by an electronic device having computer capabilities.

A computer readable medium having stored thereon a computer program product may comprise computer program code portions for executing the method, as described in the description and the claims, for providing control data when the computer program code portions are run by an electronic device having computer capabilities.

A computer program product may comprise computer program code portions for executing the method, as described in the description and the claims, for requesting control data when the computer program code portions are run by an electronic device having computer capabilities.

A computer readable medium having stored thereon a computer program product may comprise computer program code portions for executing the method, as described in the description and the claims, for requesting control data when the computer program code portions are run by an electronic device having computer capabilities.

The many features and advantages of the invention are apparent from the detailed specification, and thus, it is intended by the appended claims to cover all such features and advantages of the invention, which fall within the scope of the invention. However, although embodiments of the method and apparatus of the invention has been illustrated in the accompanying drawings and described in the foregoing detailed description, the disclosure is illustrative only and changes, modifications and substitutions may be made without departing from the scope of the invention as set forth and defined by the following claims.

The invention claimed is:

1. A method of updating location numbers of cells associated with a mobile switching center (MSC), the method comprising:
    receiving in the MSC within a first time interval, a location number for a cell with an updated second set of one or more digits representing a second discount and updating the location number of the cell stored in the MSC, wherein the location number for each cell is stored in a database of the MSC, said location number comprising a number of digits identifying the cell and representing a discount applicable to the cell, wherein a first set of one or more digits of the location number represents a first discount applicable to service usage in the cell and a second set of one or more digits of the location number represents the second discount applicable to the service usage in the cell;
    in response to any service request received during the first time interval, fetching the location number from the database of the MSC for the cell, from which the service is originating, and sending the location number to a charging system for charging of the requested service with the first discount;
    receiving in the MSC within a second time interval following the first time interval, the location number for the cell with an updated first set of the one or more digits representing the first discount and updating the location number of the cell stored in the MSC, wherein the first and second time intervals are any consecutive time intervals of a determined length repeated any number of times; and
    in response to any service request received during the second time interval, fetching the location number from the database of the MSC for the cell, from which the service is originating, and sending the location number to the charging system for charging of the requested service with the second discount.

2. The method according to claim 1, wherein the first set of the one or more digits of the location number comprises one or more digits identifying a service associated with the first discount and the second set of the one or more digits of the location number comprises one or more digits identifying a service associated with the second discount.

3. The method according to claim 1, wherein the location number comprises a number of digits configured either in one or more groups of digits.

4. The method according to claim 3, wherein the location number comprises not more than 15 digits.

5. The method according to claim 1, wherein each set of the one or more digits are any available number of digits of the location number.

6. A computer program product comprising a nontransitory computer readable medium, having thereon: computer program code means, when executed by a computer, for causing the computer to perform the method of claim 1.

7. A mobile switching center (MSC) for updating location numbers of cells associated with the MSC, comprising:
    a data store component configured to store a location number for each of the cells, wherein said location number comprising a number of digits identifying the cell and representing a discount applicable to a cell, wherein a first set of one or more digits of the location number represents a first discount applicable to service usage in the cell and a second set of one or more digits of the location number represents a second discount applicable to service usage in the cell;
    a location number receiving component configured to receive during a first time interval, the location number for each of the cells with an updated second set of the one or more digits representing the second discount; and
    receive during a second time interval following the first time interval, the location number for each of the cells with an updated first set of the one or more digits representing the first discount, wherein the first and second time intervals are any consecutive time intervals of a determined length repeated any number of times;
    a location number updating component configured to update, during the first time interval, the location number of each of the cells stored in the MSC; and update, during the second time interval, the location number of each of the cells stored in the MSC;
    a service request receiving component configured to receive a service request; and
    a location number fetching and sending component configured to fetch from the data store component, the location number for the cell, from which the service is originating, and send the location number to a charging system for charging of the requested service with the first discount, in response to any service request received during the first time interval; and
    fetch from the data store component, the location number for the cell, from which the service is originating, and send the location number to the charging system for charging of the requested service with the second discount, in response to any service request received during the second time interval.

8. The method according to claim 2 wherein the location number comprises a number of digits configured either in one or more groups of digits.

9. The method according to claim 8, wherein the location number comprises not more than 15 digits.

10. The method according to claim 2, wherein each set of the one or more digits are any available number of digits of the location number.

11. The MSC of claim 7, wherein the first set of the one or more digits of the location number comprises one or more digits identifying a service associated with the first discount and the second set of the one or more digits of the location number comprises one or more digits identifying a service associated with the second discount.

12. The MSC of claim 7, wherein the location number comprises a number of digits configured either in one or more groups of digits.

13. The MSC of claim 12, wherein the location number comprises not more than 15 digits.

14. The MSC of claim 7, wherein each set of the one or more digits are any available number of digits of the location number.

\* \* \* \* \*

UNITED STATES PATENT AND TRADEMARK OFFICE
CERTIFICATE OF CORRECTION

PATENT NO.        : 8,880,024 B2
APPLICATION NO.   : 13/393190
DATED             : November 4, 2014
INVENTOR(S)       : Ye et al.

It is certified that error appears in the above-identified patent and that said Letters Patent is hereby corrected as shown below:

In the Specification

In Column 5, Line 67, delete "then that," and insert -- than that, --, therefor.

In Column 6, Line 52, delete "System 112" and insert -- System 122 --, therefor.

In Column 6, Line 64, delete "MSC 122" and insert -- MSC 110 --, therefor.

In Column 7, Line 8, delete "MSC 122" and insert -- MSC 110 --, therefor.

In Column 7, Line 12, delete "MSC 122," and insert -- MSC 110, --, therefor.

In Column 7, Line 38, delete "MSC 122" and insert -- MSC 110 --, therefor.

In Column 7, Line 43, delete "MSC 122 already has been able to updated" and insert -- MSC 110 already has been able to update --, therefor.

In Column 8, Line 4, delete "MSC 122" and insert -- MSC 110 --, therefor.

In Column 8, Line 9, delete "MSC 122 already has been able to updated" and insert -- MSC 110 already has been able to update --, therefor.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*